Patented Aug. 4, 1936

2,050,182

UNITED STATES PATENT OFFICE 2,050,182

TOMATO MARMALADE AND PROCESS OF MAKING SAME

Horace Kay, New York, N. Y.

No Drawing. Application November 19, 1934, Serial No. 753,700

1 Claim. (Cl. 99—101)

This invention relates to food products and more particularly refers to improvements in marmalades and in their processes of manufacture.

The preparation of jams and marmalades is based upon the fact that concentrated sugar solution prevents the growth of organisms and has, therefore, a preservative action. All fruits containing as they do a large percentage of water are naturally liable to decomposition unless the greater percentage of the water is removed and the percentage of sugar is greatly increased.

For the production of a thoroughly satisfactory marmalade or jam, it is necessary to pay careful attention to both the ingredients and the method of cooking employed. The ingredients should be carefully balanced so as to answer certain requirements which are essential to the production of the proper consistency and flavor in the marmalade, as well as its keeping qualities; while the method of cooking should be such as to produce a proper balance between the amount of water left in the marmalade and the sugar content, which should not be concentrated to the point of inducing its crystallization.

Insofar as the ingredients themselves are concerned, for the successful production of a good marmalade, it is desirable that some degree of gelatinization be present, although not to the extent which is required in the production of jellies; therefore, as a rule to such fruits as have no gelatinizing power an addition of fruit juices, such as apple or gooseberry, or else an addition of commercial pectin is usually made.

In view of all the conditions which must be met in the making of such products, heretofore considerable difficulty has been experienced in making marmalades or jams out of certain fruits which are deficient in either organic acid or pectin, or which contain an excessive quantity of water.

For instance, the production of tomato marmalade has not been heretofore entirely successful, principally, because, owing to the large percentage of water contained in the fruit, it was not possible to prevent the disintegration of the fruit and the fermentation of the product after a relatively short time.

In the usual method followed in the preparation of marmalade, the boiling down of the fruit is carried out very rapidly, so that the natural color of the fruit shall be little affected. Considerable experience is required to stop at the right point, because too short boiling leaves an excess of water, leading to fermentation, while over concentration promotes crystallization of the sugar.

On the other hand, I have found that in the case of tomatoes it is necessary to cook the mass for a considerable length of time if fermentation is to be prevented. At the same time, it is, of course, necessary to prevent the disintegration of the fruit and the crystallization of the sugar and to insure the keeping qualities of the product, without the addition of preservatives and without the use of starch glucose. Preservatives such as, for instance, salicylic acid, are generally used to counteract the effect of an excess of water and a certain percentage of starch glucose is frequently used because it is devoid of crystallizing power. However, the use of preservatives is to be avoided as unfavorably affecting the flavor of the product and the use of starch glucose also because it results in the production of a somewhat more aqueous and gelatinous product.

Furthermore, in order to insure a maximum of excellence in the flavor of the product itself, it is well to avoid the use of pectin or acid extracts because a far more palatable product can be obtained if these two elements are supplied in their natural form.

The primary object of this invention accordingly is to provide a novel and improved method of making tomato marmalade, whereby the product will have the proper consistency and a highly palatable flavor and will keep almost indefinitely without fermenting or losing its consistency.

Another object is to provide a method of making tomato marmalade, where the fruit will be effectively prevented from disintegrating under the influence of heat while cooking.

A further object is to provide in a process of making tomato marmalade an addition of a suitable fruit; capable of supplementing the pectin and acid content of the tomatoes in a form inducing the proper amount of gelatinization in the product and preventing the crystallization of the sugar, even though the product is cooked for a comparatively long time.

A still further object is to provide, as a new article of manufacture, a marmalade made of tomatoes with certain other component elements which go to improve the flavor and to insure the proper consistency and permanency of the product.

Other objects and advantages of the present invention will more fully appear as the description proceeds and will be set forth and claimed in the appended claim.

In carrying out my invention I take a certain quantity of tomatoes, preferably the so-called red plum tomatoes, which should be not quite ripe, and dip them for just an instant in boiling water, so that the skin can be easily removed without paring away any of the pulp. The skin is then removed but care should be paid to leaving in place the spot where the stem is attached onto the fruit, the stem itself, however, of course, being removed.

This is an important detail in the method of preparing the marmalade, because if neglected the fruit will easily disintegrate during the cooking process, whereas if proper attention is paid to this requirement the fruit will remain whole or practically so.

I now take an equal part of sugar by weight, five sliced lemons and two ounces of cloves for each ten pounds of tomatoes and place the entire mass into a suitable pot, the tomatoes, as stated, being left whole.

The product is cooked over a slow fire until the sugar has practically melted. At this time, the fire is raised to medium intensity, just sufficient to boil the mixture, and the same is allowed to cook for about three hours. During this cooking some of the tomatoes may break up to a certain extent, but will retain their consistency, and most of them will remain entirely whole, while the sugar will jelly them.

At the end of this period of cooking the marmalade is poured hot into sterilized jars, which are then covered to protect their contents from dust. Paraffin may be used, if desired, but I have found it to be unnecessary as long as a suitable covering is provided for the jar.

The action of the lemons, for which limes or other citrus fruits could be substituted, is very effective in preventing crystallization of the sugar, thus allowing a material reduction of the water content of the fruit to take place. The pectin in the lemons also assists the gelatinizing process so that, as a result, the product will keep indefinitely, although no preservative of any sort is used. The cloves provide a palatable flavor and assist in the preservation of the fruit, but other suitable flavoring ingredients can be used instead, if preferred.

The marmalade thus produced possesses not only a high degree of consistency, but also has a very attractive appearance, inasmuch as the addition of the citrus fruit seems to prevent the discoloration of the fruit, which would ordinarily take place due to the prolonged cooking.

It is also well to observe that the prolonged cooking is responsible for the fact that the product will retain its consistency practically for an indefinite length of time without becoming watery, because if the time of cooking should be materially reduced to a point close to that used in ordinary practice, the product would not keep for a very long time, although it would be fairly satisfactory for reasonably prompt consumption.

I claim:

The process of preparing tomato marmalade, which consists in peeling a certain quantity of tomatoes without removing that part of their outer surface where the stem is attached to the body of the fruit, adding a substantially equal amount of sugar by weight, a certain proportion of citrus fruit, and a relatively small quantity of flavoring spice, cooking slowly until the sugar is about melted, and then boiling the mixture on a moderate fire without the addition of water for a period of about three hours.

HORACE KAY.